United States Patent
Suresh et al.

(10) Patent No.: US 11,205,017 B2
(45) Date of Patent: Dec. 21, 2021

(54) POST QUANTUM PUBLIC KEY SIGNATURE OPERATION FOR RECONFIGURABLE CIRCUIT DEVICES

(71) Applicant: Intel Corporation, Santa Clara, CA (US)

(72) Inventors: Vikram Suresh, Portland, OR (US); Sanu Mathew, Portland, OR (US); Rafael Misoczki, Hillsboro, OR (US); Santosh Ghosh, Hillsboro, OR (US); Raghavan Kumar, Hillsboro, OR (US); Manoj Sastry, Portland, OR (US); Andrew H. Reinders, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 222 days.

(21) Appl. No.: 16/456,339

(22) Filed: Jun. 28, 2019

(65) Prior Publication Data
US 2019/0325166 A1    Oct. 24, 2019

(51) Int. Cl.
*G06F 21/72* (2013.01)
*G06F 21/76* (2013.01)
(Continued)

(52) U.S. Cl.
CPC .............. *G06F 21/72* (2013.01); *G06F 21/76* (2013.01); *H04L 9/0852* (2013.01);
(Continued)

(58) Field of Classification Search
None
See application file for complete search history.

(56) References Cited

U.S. PATENT DOCUMENTS

2018/0241554 A1    8/2018    Ghosh

FOREIGN PATENT DOCUMENTS

| CN | 112152782 A | 12/2020 |
| EP | 3758275 A1 | 12/2020 |

OTHER PUBLICATIONS

Hansen, Miranda "FPGA for Beginners: Glossary and Setup" [online] Diligent Blog, Jul. 20, 2018 [retrieved Apr. 9, 2021]. Retrieved from the Internet: URL: https://blog.digilentinc.com/fpga-for-beginners-glossary-and-setup/ (Year: 2018).*

(Continued)

*Primary Examiner* — Taghi T Arani
*Assistant Examiner* — Joshua Raymond White
(74) *Attorney, Agent, or Firm* — Jaffery Watson Mendonsa & Hamilton LLP

(57) ABSTRACT

Embodiments are directed to post quantum public key signature operation for reconfigurable circuit devices. An embodiment of an apparatus includes one or more processors; and a reconfigurable circuit device, the reconfigurable circuit device including a dedicated cryptographic hash hardware engine, and a reconfigurable fabric including logic elements (LEs), wherein the one or more processors are to configure the reconfigurable circuit device for public key signature operation, including mapping a state machine for public key generation and verification to the reconfigurable fabric, including mapping one or more cryptographic hash engines to the reconfigurable fabric, and combining the dedicated cryptographic hash hardware engine with the one or more mapped cryptographic hash engines for cryptographic signature generation and verification.

15 Claims, 13 Drawing Sheets

(51) Int. Cl.
*H04L 9/32* (2006.01)
*H04L 9/08* (2006.01)
(52) U.S. Cl.
CPC .......... *H04L 9/3239* (2013.01); *H04L 9/3247* (2013.01); *H04L 2209/38* (2013.01)

(56) References Cited

OTHER PUBLICATIONS

Xiao et al. "Hardware/Software Adaptive Cryptographic Acceleration for Big Data Processing" [online] Hindawi, Aug. 27, 2018. [retrieved Apr. 9, 2021]. Retrieved from the Internet: URL: https://downloads.hindawi.com/journals/scn/2018/7631342.pdf (Year: 2018).*
Wang, Wen et al. "XMSS and Embedded Systems: XMSS Hardware Accelerators for RISC-V" [online] Cryptology ePrint Archive, May 22, 2019 [retrieved Apr. 9, 2021]. Retrieved from the Internet: URL: https://eprint.iacr.org/eprint-bin/getfile.pl?entry=2018/1225&version=20190522:113021&file=1225.pdf (Year: 2019).*
Lu, Ting et al. "Secure Device Manager for Intel Stratxc 10 Devices Provides FPGA and SoC Security" [online] Intel, Jun. 8, 2015 [retrieved Apr. 9, 2021]. Retrieved: URL: https://www.intel.com/content/dam/www/programmable/us/en/pdfs/literature/wp/wp-01252-secure-device-manager-for-fpga-soc-security.pdf (Year: 2015).*
Xiao et al. "Hardware/Software Adaptive Cryptographic Acceleration for Big Data Processing" [online] Hindawi, Aug. 27, 2018. [retrieved Apr. 9, 2021]. Retrieved from the Internet: URL: https://downloads.hindawi.com/journals/scn/2018/7631342.pdf (Year: 2018) (Year: 2018).*
Extended European Search Report for EP Application No. 20164630.4, dated Jul. 17, 2020, 9 pages.
Santosh Ghosh, et al., "Lightweight Post-Quantum-Secure Digital Signature Approach for IoT Motes". IACR Interntional Association for Cryptologic Research, vol. 20190213:033538, Feb. 7, 2019, pp. 1-23, XP061031800.
Buchmann, Johannes A., et al., "Physical Attack Vulnerability of Hash-Based Signature Schemes", Technische Universitat Darmstadt, Department of Computer Science Cryptography and Computer Algebra, Sep. 18, 2017, pp. 1-79.
Buchmann, Johannes A., et al., "On the Security of the Winternitz One-Time Signature Scheme", Full version, Technische Universitat Darmstadt, Proceedings of Africacrypt 2011, pp. 1-17.
Buchmann, Johannes A., et al., "XMSS—A Practical Forward Secure Signature Scheme based on Minimal Security Assumptions", Second Version, 26. Nov. 2011, Cryptography and Computeralgebra, Department of Computer Science, TU Darmstadt, pp. 1-22.
Hulsing, Andreas, "W-OTS+—Shorter Signatures for Hash-Based Signature Schemes", (2013) Cryptography and Computeralgebra, Department of Computer Science, TU Darmstadt, pp. 1-18.

* cited by examiner

One-Time Hash-Based Signatures 1 signing key → 1 signature → 1 verification key

A private key must only sign a single message

Multi-Time Hash-Based Signatures

A private key can sign multiple messages

WOTS One-Time Signature Scheme

Message is hashed and parsed into M:67 integers between [0,1,2,...15]

205 — Public Key pk: 67 components of 32-bytes each

210 — Signature s: 67 components of 32-bytes each

215 — Public Key pk: 67 components of 32-bytes each

POST QUANTUM PUBLIC KEY SIGNATURE OPERATION FOR RECONFIGURABLE CIRCUIT DEVICES

TECHNICAL FIELD

Embodiments described herein generally relate to the field of electronic devices and, more particularly, post quantum public key signature operation for reconfigurable circuit devices.

BACKGROUND

Cryptography is implemented in computing systems to provide for secure data storage and communication. The security technology that is employed includes public-key digital signature algorithms, including RSA (Rivest-Shamir-Adleman) and ESDSA (Elliptic Curve Digital Signature Algorithm), which generally provide effective security.

However, with the introduction of quantum computing, existing security technology may be inadequate. Quantum computing may be capable of breaking through systems that were previously believed to be highly secure, thus requiring Post-Quantum Cryptography solutions to prevent data losses in the face of the new challenges posed by quantum computing.

In particular, existing public-key digital signature algorithms such as RSA and ECDSA are not secure against attacks with post-quantum computers employing Shor's algorithm, which enables the factoring of large integers and the computation of discrete logarithms in polynomial time. As a result, there are efforts underway define new standards for Post Quantum algorithms that are secure against quantum computers, with XMSS (Extended Merkel Signature Scheme) being the first post-quantum secure public-key digital signature scheme.

However, reconfigurable devices such as FPGA (Field Programmable Gate Array) and CPLD (Complex Programmable Logic Device) devices are increasingly utilized in technologies requiring digital signature verification because of flexibility such devices allow. XMSS requires significant processing, and thus there are significant challenges in implementing XMSS in devices such as FPGAs and CLPDs and providing adequate performance.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
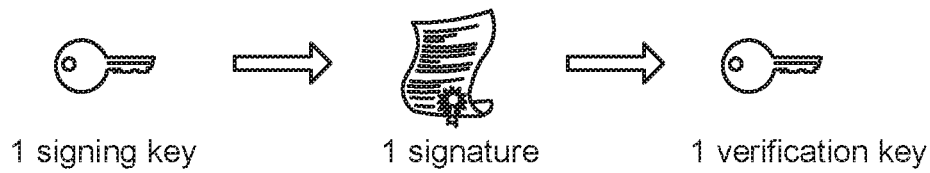
FIGS. 1A and 1B illustrate a one-time hash-based signatures scheme and a multi-time hash-based signatures scheme, respectively.

Embodiments described herein are directed to post quantum public key signature operation for reconfigurable circuit devices.

There are efforts underway in the crypto-research community and standards bodies (IETF (Internet Engineering Task Force), NIST (National Institute of Standards and Technology)) to define new standards for algorithms that are secure against quantum computers. XMSS (Extended Merkel Signature Scheme) is the first post-quantum secure public-key digital signature scheme to be published by the Internet Engineering Task Force (IETF) in RFC-8391. XMSS is a hash-based signature technology created to provide an efficient post-quantum signature operation with minimal security assumptions.

However, XMSS requires significant processing, and thus there are significant challenges in implementing XMSS in devices such as FPGAs (Field Programmable Gate Arrays) and CPLDs (Complex Programmable Logic Devices) and providing adequate performance.

In some embodiments, an optimized post quantum public key verification engine is provided for implementation in reconfigurable circuit devices such as FPGA and CPLD, wherein the technology can provide up to 33% improvement in XMSS signature generation/verification latency. In some embodiments, an XMSS implementation for reconfigurable circuit devices includes one or more of the following:

(i) An accelerator leverages an existing cryptographic hash hardware engine, such as a SHA-2 (Secure Hash Algorithm 2) hardware engine, in the reconfigurable circuit device to implement pre-hash optimizations in the latency critical WOTS and L-Tree operations of XMSS;

(ii) A state machine performs a resource-aware hash chains distribution to maximize resource utilization between existing cryptographic hash hardware and on-fabric dedicated cryptographic hash accelerators; and (iii) The state machine implementation provides reconfigurability to map all sequential logic for local storage to embedded RAM to trade-off memory vs LUT (Look-Up Table) utilization.

A conventional FPGA implementation of a public key verification technology XMSS may either map the entire XMSS accelerator onto the reconfigurable fabric of the FPGA, or alternatively use the existing SHA-2 hardware engine in conventional mode to perform the XMSS hash operations. However, the conventional are inadequate. Mapping an entire XMSS accelerator onto the FPGA fabric requires a significant amount Look-Up Tables (LUTs), thus negatively affecting the overall resource utilization. This limits other security features from being accelerated on an FPGA. While leveraging the existing SHA-2 engine on FPGAs alleviates this problem, a generic SHA-2 based implementation does not make use of pre-hash optimizations in the XMSS algorithm, thereby limiting XMSS sign/verify performance.

In some embodiments, an apparatus, system, or process provides an XMSS implementation for reconfigurable circuit devices by mapping a state machine implementing pre-hash optimized WOTS and L-Tree operations, and leveraging the existing SHA-2 hardware engine of the reconfigurable circuit device for the core XMSS hash operations. Further, the state machine can be conditionally configured to re-distribute LUT and embedded RAM utilization to provide flexibility for implementing other features on the reconfigurable circuit device.

In this manner, an embodiment of an XMSS implementation in a reconfigurable circuit device leverages existing SHA-2 hardware engine to perform the hash operations in XMSS, thus minimizing device resource utilization. To improve performance, an XMSS state machine implementing the pre-hash optimization is mapped to the reconfigurable circuit device fabric, resulting in 33% lower XMSS latency. The XMSS state machine is also reconfigurable to use either LUTs or embedded RAM for storing intermediate hash values depending on resource availability, enabling optimal usage of the device reconfigurable fabric.

Post-Quantum Cryptography

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Shor, P. W. "Algorithms for quantum computation: discrete logarithms and factoring". Proceedings 35th Annual Symposium on Foundations of Computer Science. IEEE Comput. Soc. Press. doi:10.1109/sfcs.1994.365700. ISBN 0818665807. Although any post-quantum cryptography could be built on the current cryptography, the novel approach would need to be intelligent, fast, and precise enough to resist and defeat any attacks by quantum computers.

Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's Hidden Field Equation (HFE) public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance, such as HBS.

Figure 1B:
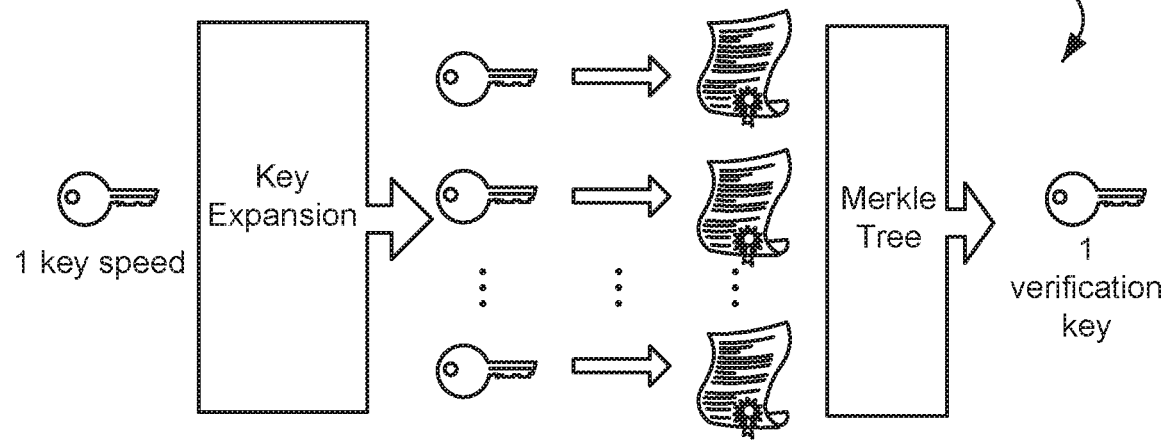

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), SPHINCS scheme, SPHINCS+ scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessary basic ingredients, such as relying on symmetric cryptography building blocks (e.g., hash functions), to counter the quantum counting and post-quantum computing challenges. HBS schemes are regarded as fast signature algorithms working with fast platform secured-boot, which is regarded as the most resistant to quantum attacks.

For example, as illustrated with respect to FIG. 1A, a scheme of FIBS is shown that uses Merkle trees along with one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
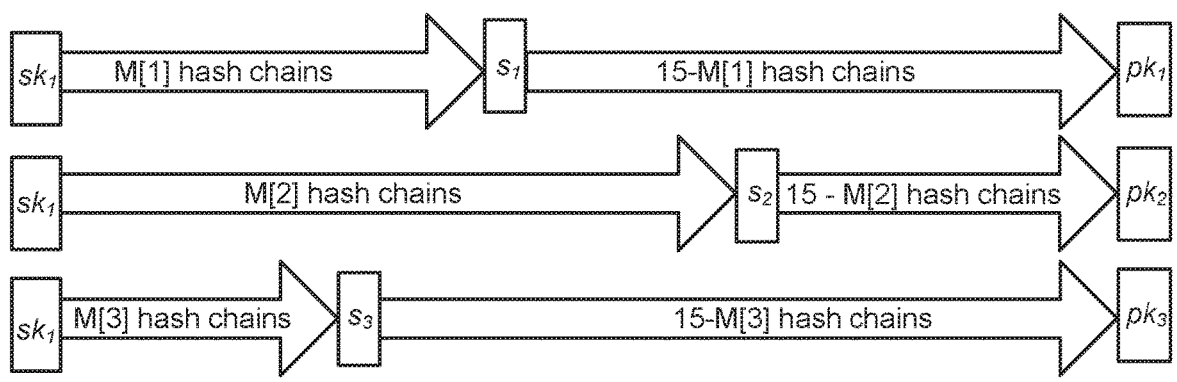
FIGS. 2A and 2B illustrate a one-time signature scheme and a multi-time signature scheme, respectively.
Figure 2A:
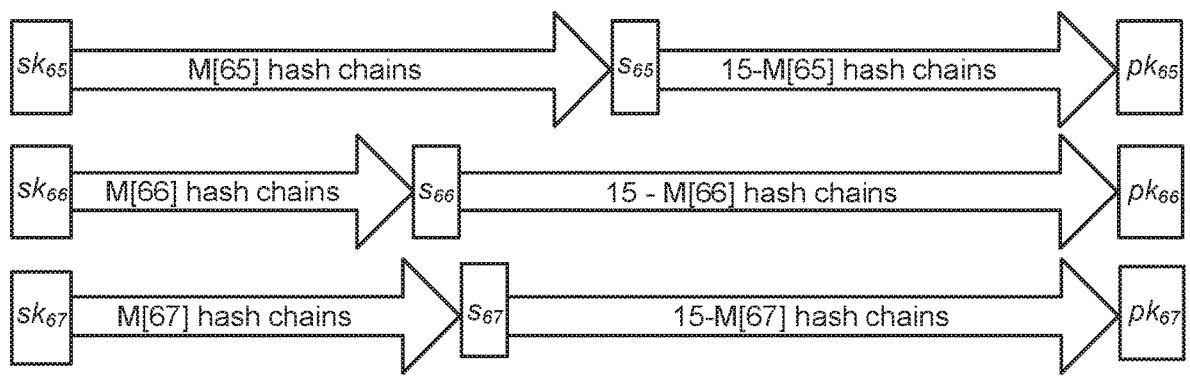
Figure 2B:
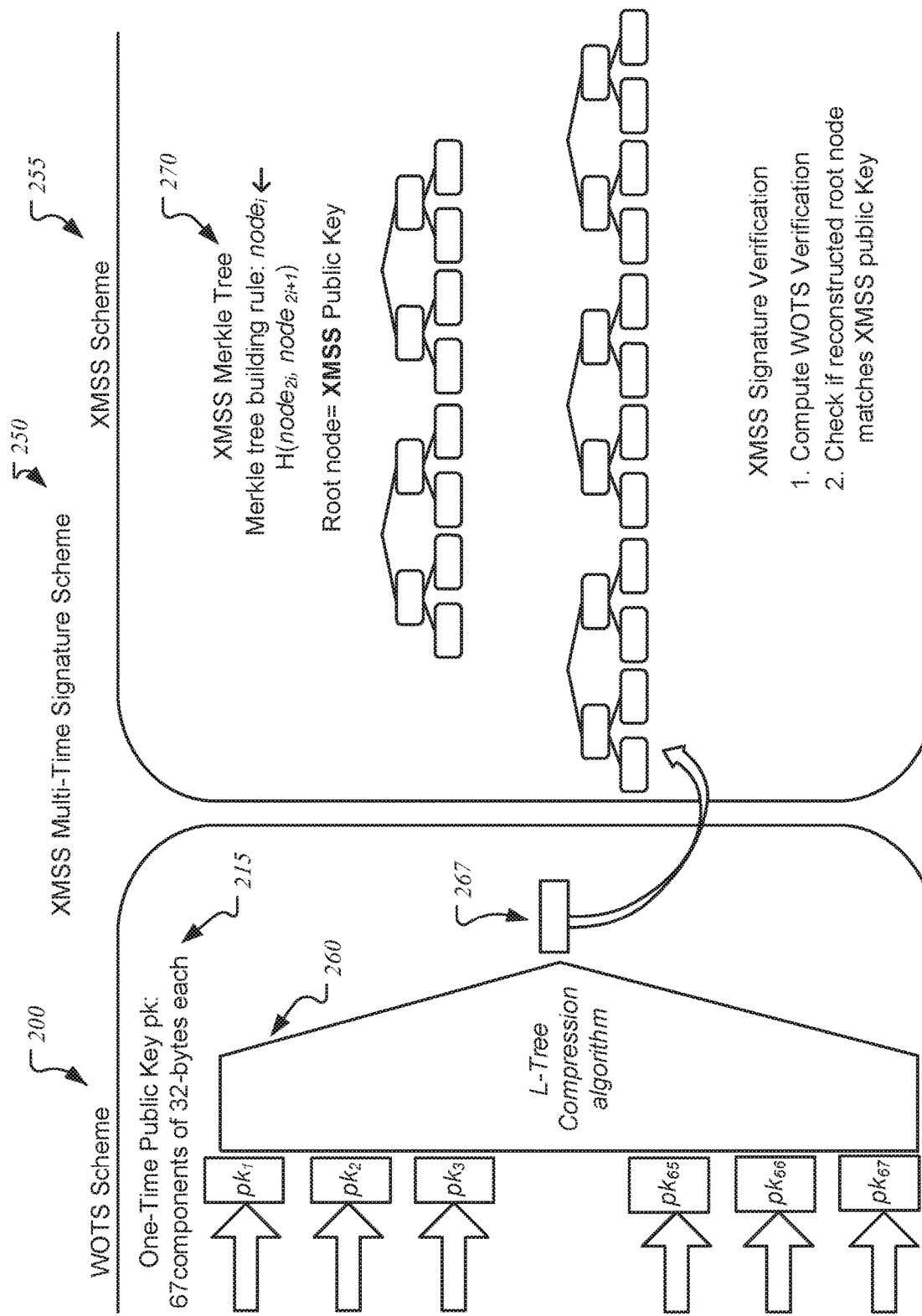

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS (WOTS) scheme 200, which was offered by Robert Winternitz of Stanford Mathematics Department, while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

Now, for example, FIG. 2B illustrates XMSS MTS scheme 250 that allows for a combination of WOTS scheme 200 of FIG. 2A and XMSS scheme 255 having XMSS Merkle tree 270. As discussed previously with respect to FIG. 2A, WOTS scheme 200 is based on a one-time public key, pk, 215, having 67 components of 32 bytes each, that is then put through L-Tree compression algorithm 260 to offer WOTS compressed pk 267 to take a place in the XMSS Merkle tree 270 of XMSS scheme 255. It is contemplated that XMSS signature verification may include computing WOTS verification and checking to determine whether a reconstructed root node matches the XMSS public key, such as root node=XMSS public key.

XMSS Engine for Reconfigurable Circuit Devices

FPGA and CPLD are critical reconfigurable devices used in cloud computing, automotive, IoT and artificial intelligence to provide workload acceleration without designing dedicated ASICs. Accelerating post-quantum secure algorithms such as XMSS on FPGA/CPLD is important to provide a seamless transition from classical cryptography, as well as support high-performance digital signature-based authentication in the coming decades.

Figure 3A:
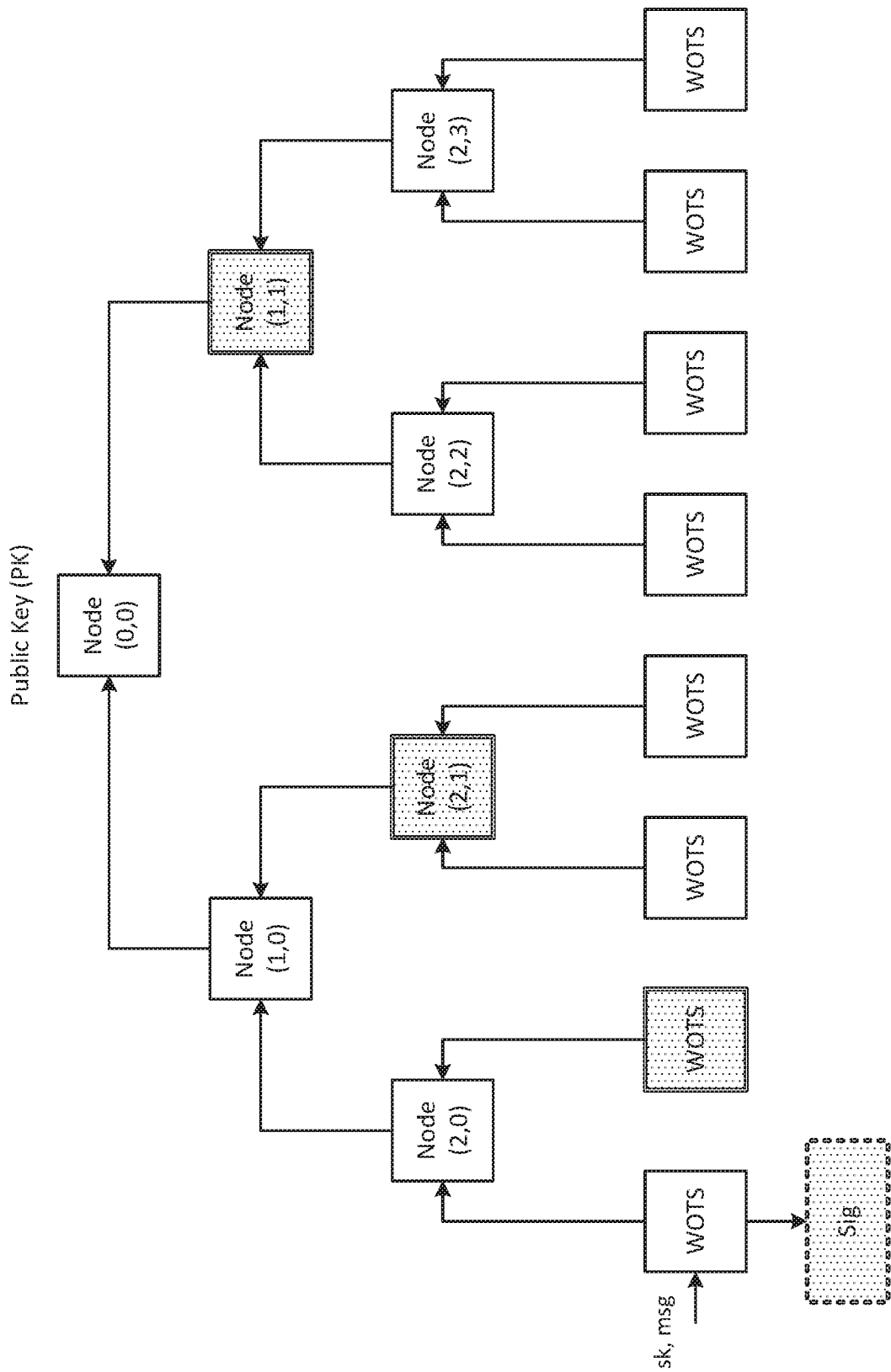
FIG. 3A illustrates an XMSS signature verification operation.

FIG. 3A illustrates an XMSS signature verification operation. XMSS is a Merkel tree structured hash-based signature scheme that uses Winternitz One Time Signature (WOTS+ version of WOTS) as the underlying operation for key generation, sign/verify operations. As illustrated in FIG. 3A, the signing operation requires the construction of a Merkel tree using the local public key from each leaf WOTS node to generate a global public key (PK). The computation of the authentication path and the root node value can be performed off-line, and hence is not a limitation on performance. Each WOTS node (illustrated as eight nodes in FIG. 3A) has a unique secret key, "sk" which is used to sign a message only once (shown in FIG. 3A as sk and msg (message) being input to a WOTS node, and resulting in the Sig (signature)). The XMSS signature consists of a signature generated for the input message (Sig) and an authentication path of intermediate tree nodes to construct the root of the Merkel tree.

Figure 3B:
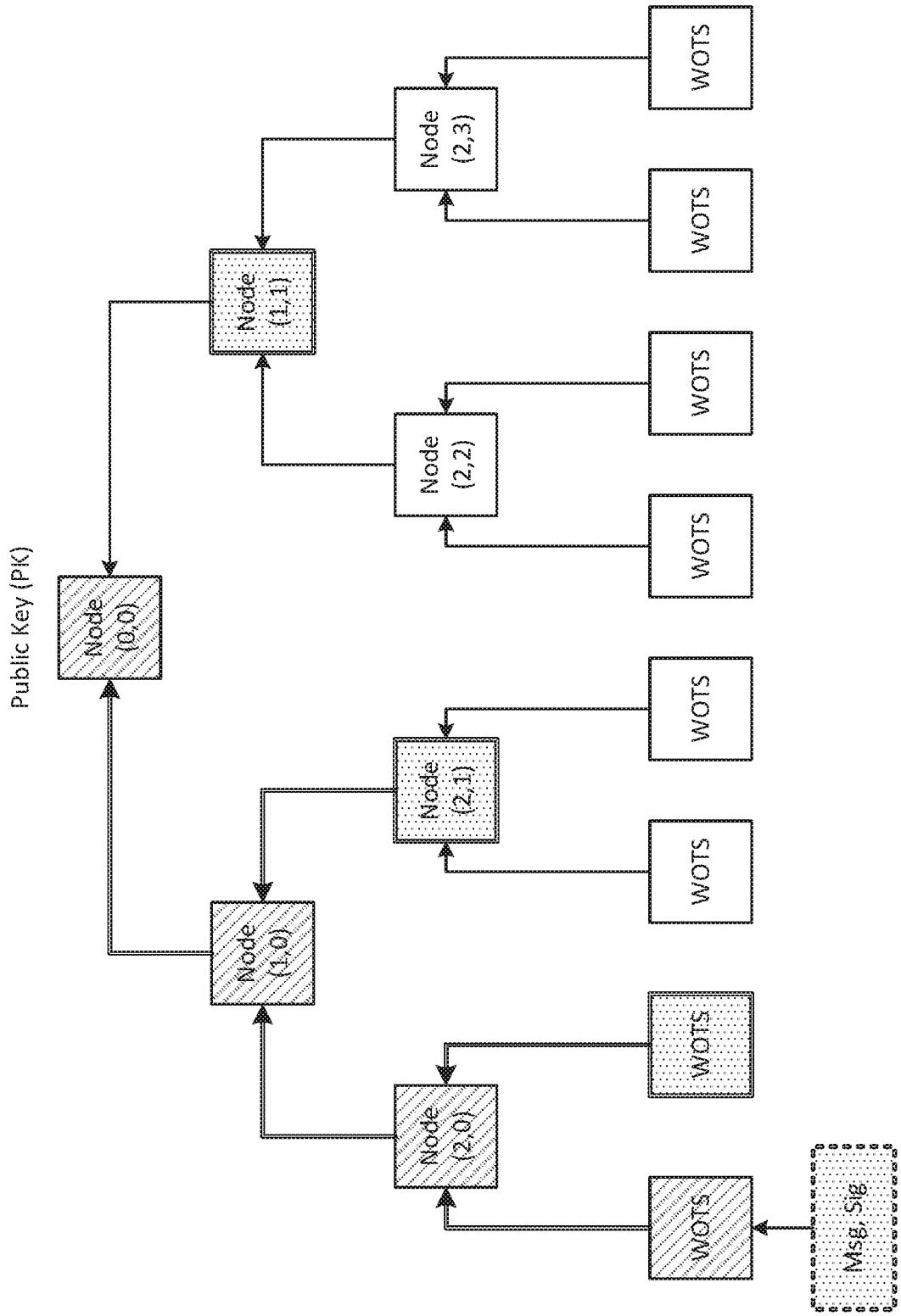
FIG. 3B illustrates computation of an XMSS local public key.

FIG. 3B illustrates computation of an XMSS local public key. During verification, the input message (Msg) and signature (Sig) are used to compute the local public key of the WOTS node, which is further used to compute the tree root value using the authentication path, as shown in FIG. 3B. A successful verification will match the computed tree root value to the public key PK shared by the signing entity. This requires a performance intensive operation during both XMSS sign and verify are input, followed by the L-Tree operation.

Figure 4A:
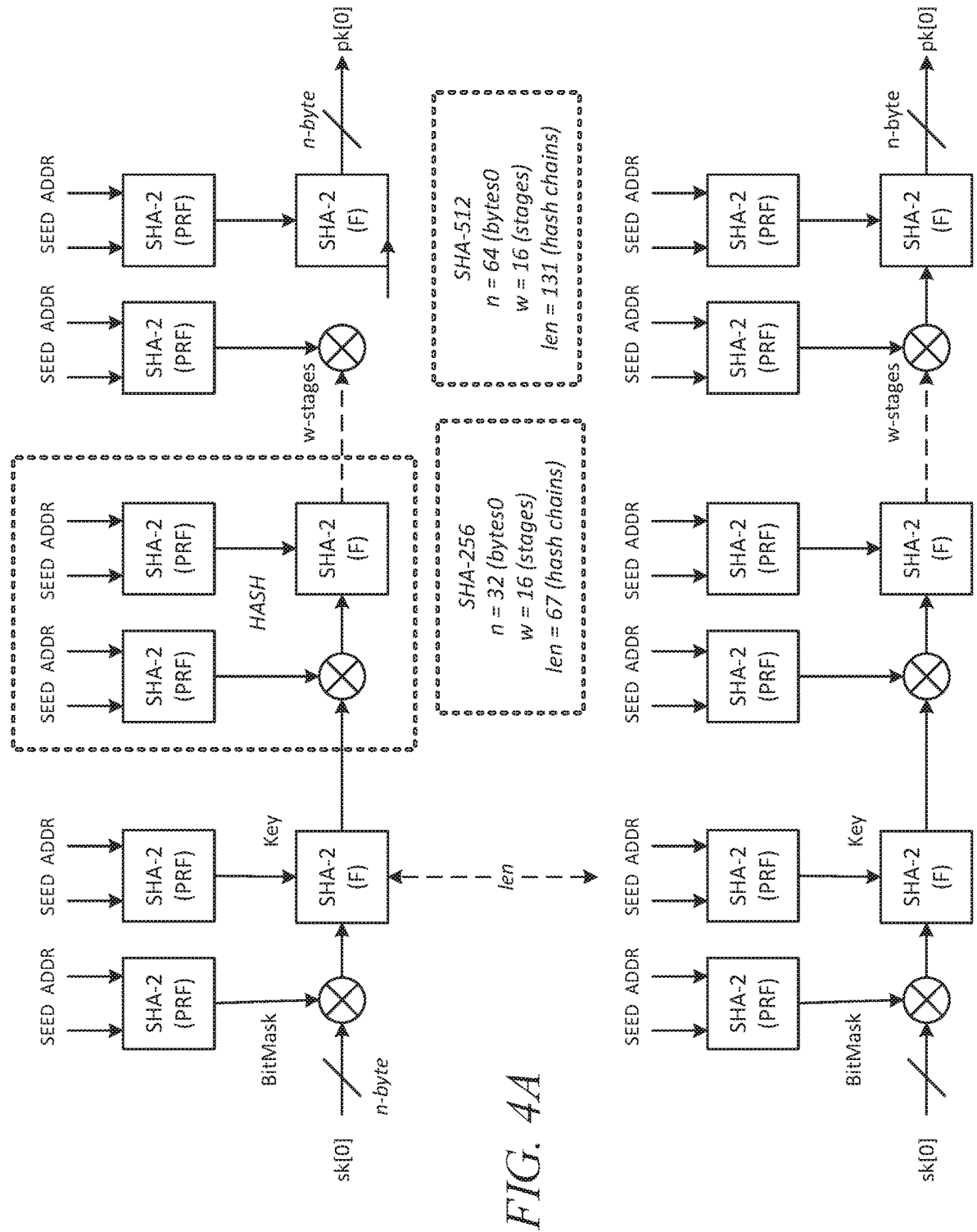
FIG. 4A illustrates a WOTS+ one-time signature operation.

FIG. 4A illustrates a WOTS+ one-time signature operation. As illustrated in FIG. 4A, a WOTS+ operation involves 67 parallel chains of 16 SHA-2-256 HASH functions, each with the secret key sk[66:0] as input. Each HASH operation in the chain consists of 2 pseudo-random functions using SHA-2-256 to generate a bitmask and a key. The bitmask is XOR-ed with the previous hash and concatenated with the key as input message to a 3rd SHA-2-256 hash operation. The 67×32-byte WOTS public key pk[66:0] is generated by hashing secret key sk across the 67 hash chains.

Figure 4B:
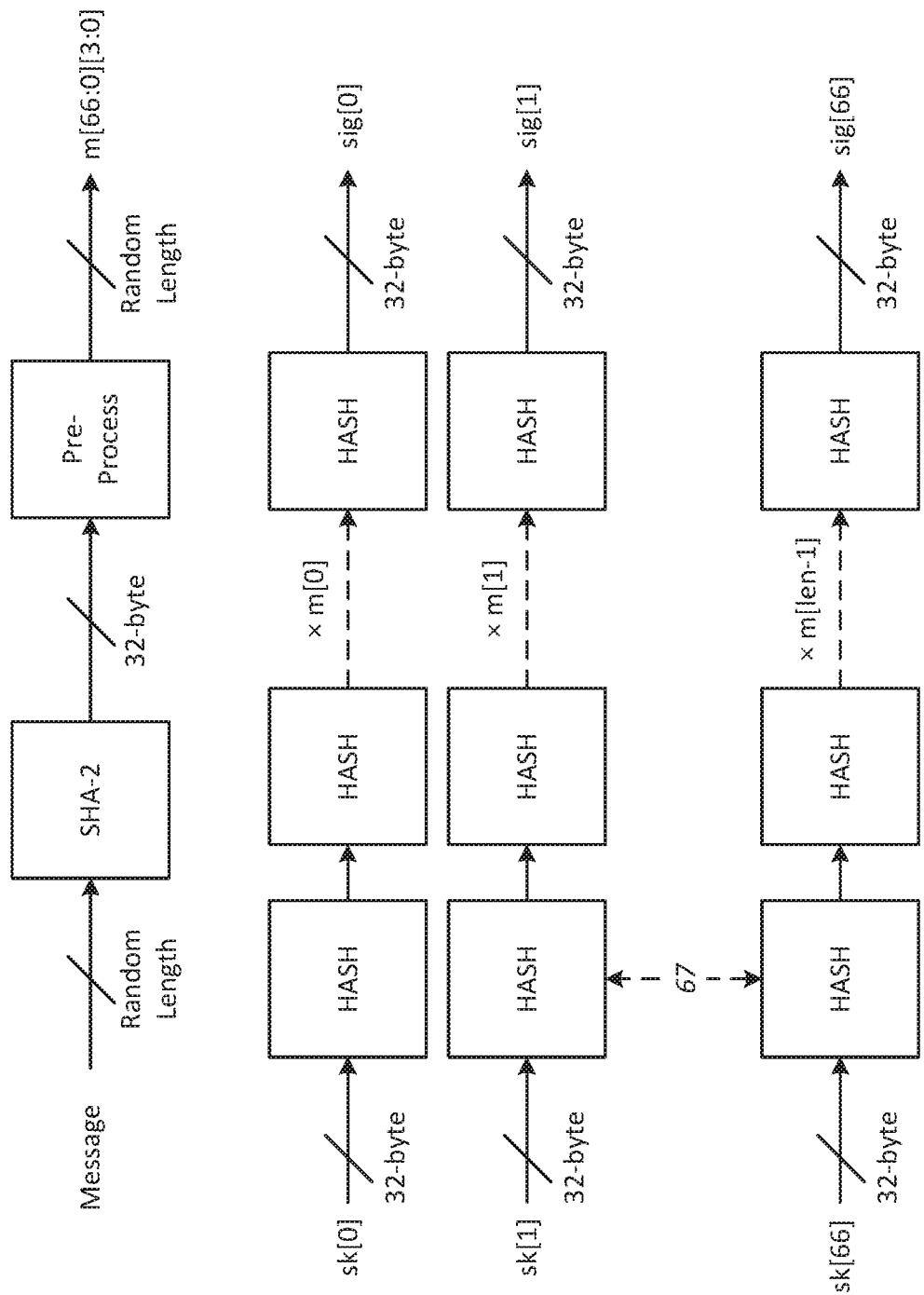
FIG. 4B illustrates WOTS signature generation.

FIG. 4B illustrates WOTS signature generation. For message signing, an input message (Message) is hashed and pre-processed to compute a 67×4-bit value (m[66:0][3:0]). This value is then used as an index to choose an intermediate hash value in each chain (shown as xm[0], xm[0], and continuing through xm[len-1]).

Figure 4C:
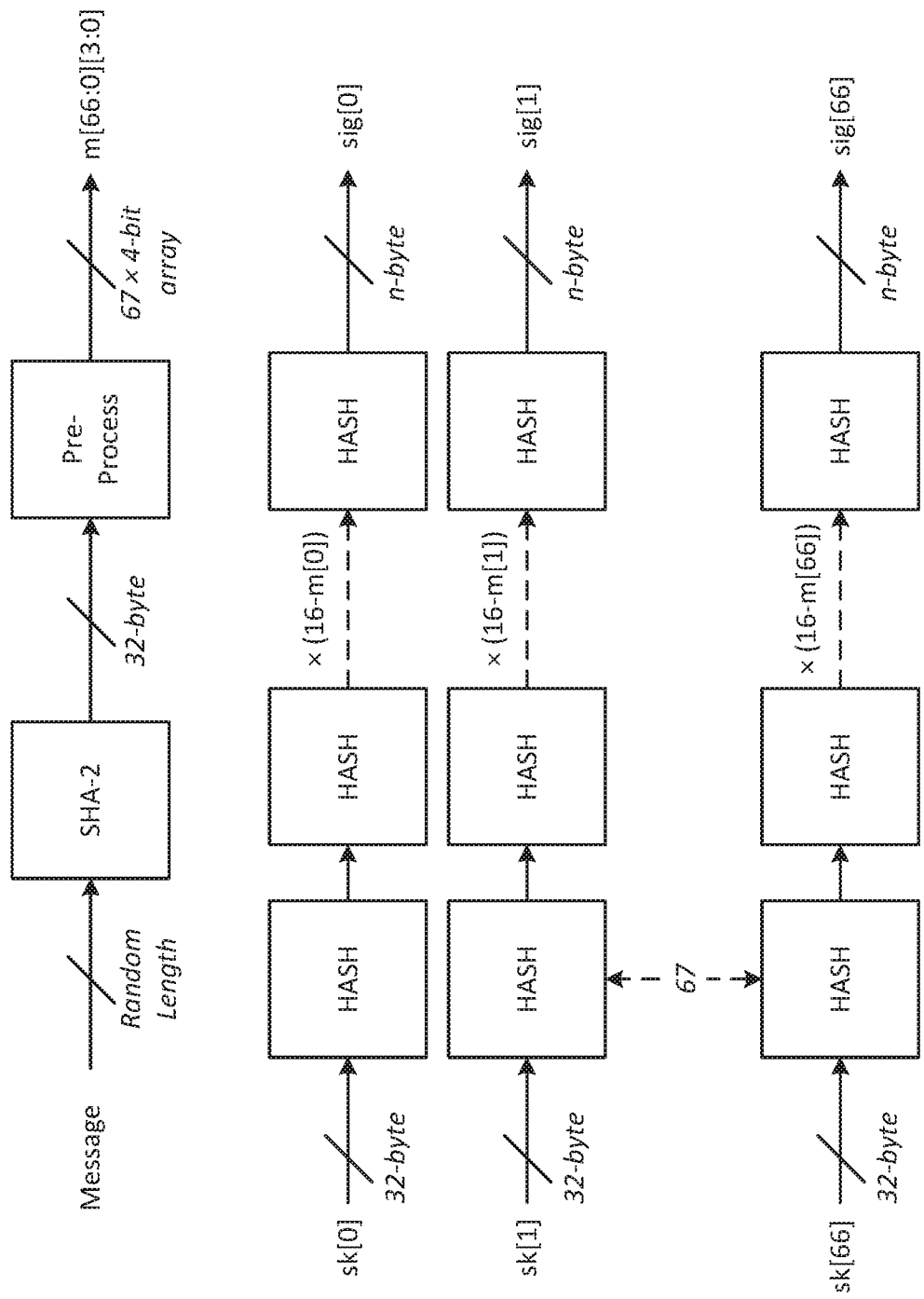
FIG. 4C illustrates WOTS signature verification.

FIG. 4C illustrates WOTS signature verification. During signature verification, the Message is again hashed to compute the signature indices and compute the remaining hash operations in each chain to compute the WOTS public key pk (pk[0] in the first chain, pk[1] in the following chain, etc.). The authentication path is used to compute the root of the Merkel tree and compare this with the shared public key PK to verify the message.

As it can be seen from the algorithm signature generation in FIG. 4B and the signature verification in FIG. 4C, acceleration the SHA-2 operation in an apparatus or system has the potential to provide to provide significant performance improvement for XMSS as completion of this operation is needed to proceed with the following operations.

Figure 5A:
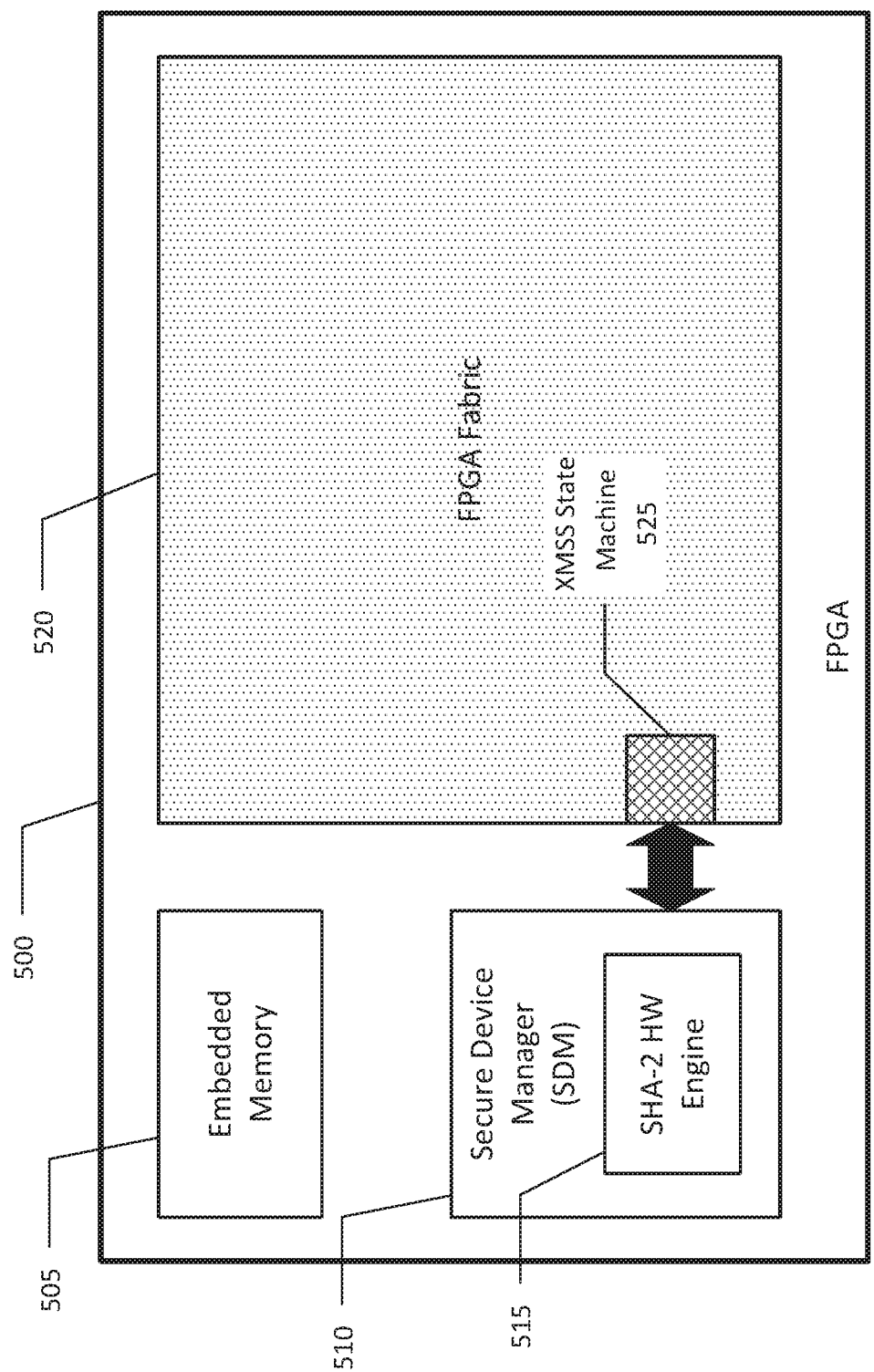
FIG. 5A illustrates an XMSS implementation for reconfigurable circuit device according to some embodiments.

FIG. 5A illustrates an XMSS implementation for reconfigurable circuit device according to some embodiments. Reconfigurable circuit devices may include cryptographic elements to support signature verification. For example, current Intel FPGAs provide crypto acceleration engines for hashing and encryption by exposing the hardware present in the Secure Device Manager (SDM).

As shown in FIG. 5A, a reconfigurable circuit device, such as the illustrated FPGA 500, may include internal embedded memory 505 (BRAMs (Block RAMs) of an FPGA, or other memory that is embedded within a reconfigurable circuit device), an SDM 510; and a programmable interconnect fabric, such as the illustrated FPGA fabric 520, that surrounds logic elements (LEs) and look-up tables (LUTs). The SDM 510 may include a cryptographic hash hardware engine, such as a SHA-2 hardware accelerator (hardware engine) 515, that may be exposed for usage.

In some embodiments, a signature verification engine for a reconfigurable circuit device includes a combination of a dedicated hardware engine of the reconfigurable circuit device with a state machine programmed in the programmable interconnect fabric of the device. In some embodiments, to leverage an existing SHA-2 hardware accelerator 515 for XMSS, an XMSS state machine 525 is implemented on the FPGA fabric. This minimizes the resource usage on the valuable FPGA fabric, while providing reasonable performance by using the existing hardware accelerator.

In some embodiments, to further improve the performance of XMSS sign/verify, the state machine 525 is designed to perform XMSS-specific pre-hash optimizations using the existing SHA-2 engine. In WOTS, the keyed-hash operations that are repeatedly performed during sign/verify uses two calls of the Pseudo Random Function (PRF) to compute a local key and bitmask by hashing a 64-byte message consisting of OPCODE‖SEED‖HASH_ADDRESS‖PADDING. Since the OPCODE and SEED are constant for an XMSS operation, the XMSS state machine 525 uses the existing SHA-2 engine 515 to pre-compute the hash value for OPCODE‖SEED and store it locally on the FPGA fabric 520. For all subsequent calls of PRF, the state machine 525 sends the precomputed hash value as the start state for the SHA-2 engine.

In some embodiments, the XMSS state machine 525 is further designed to perform a similar optimization during the L-Tree operation. The L-Tree operation consists mainly of a randomized hash function (RAND_HASH) that calls the PRF function three times to compute a local key and two bitmask values. Again, the state machine pre-computes the hash value for OPCODE‖SEED and re-uses it for all subsequent calls of RAND_HASH during L-Tree computation. The WOTS and L-Tree optimizations, by selectively hashing using the on-chip SHA-2 hardware engine 515, can provide an overall improvement of approximately 33% in XMSS sign/verify operations.

In some embodiments:

(i) An accelerator leverages the existing SHA-2 hardware engine 515 in the reconfigurable circuit device to implement pre-hash optimizations in the latency critical WOTS and L-Tree operations of XMSS;

(ii) The XMSS state machine 525 is to performs a resource-aware hash chain distribution to maximize resource utilization between existing SHA-2 hardware 515 and on-fabric dedicated SHA accelerators; and (iii) The XMSS state machine 525 implementation provides reconfigurability to map all sequential logic for local storage to embedded RAM to trade-off memory vs LUT (Look-Up Table) utilization.

Figure 5B:
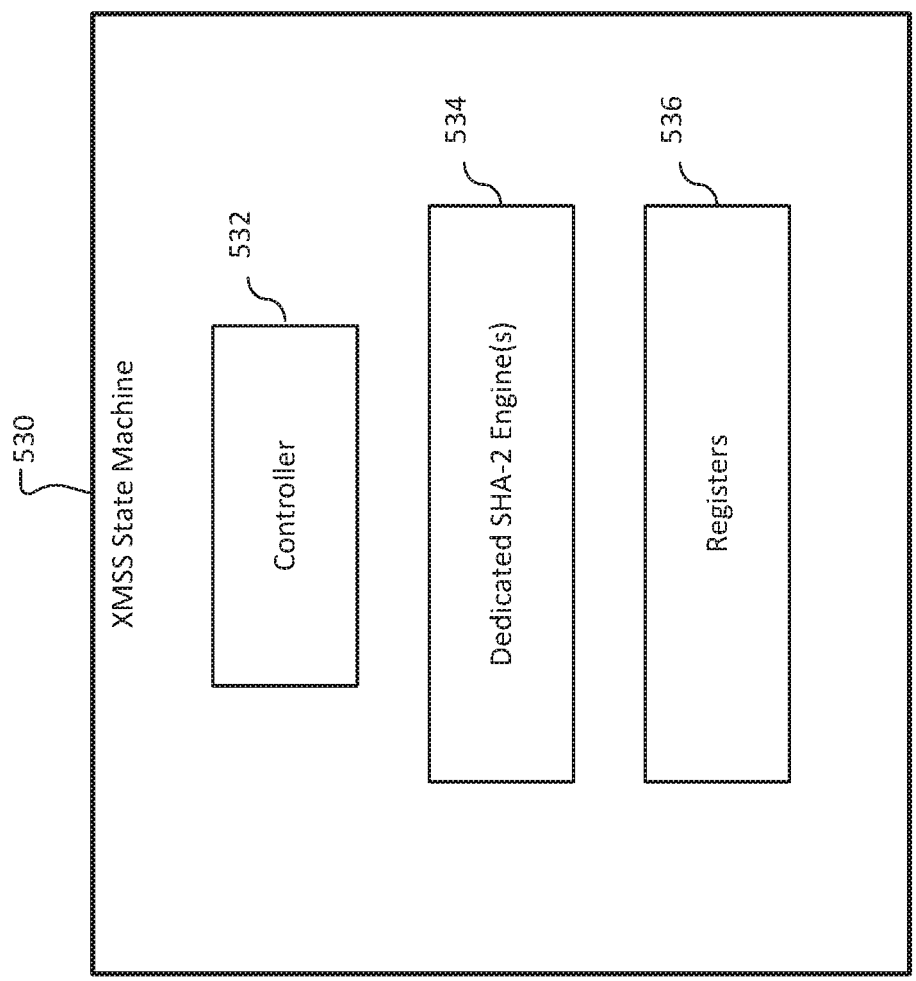
FIG. 5B is an illustration of a state machine of an XMSS implementation for a reconfigurable circuit device according to some embodiments.

FIG. 5B is an illustration of a state machine of an XMSS implementation for a reconfigurable circuit device according to some embodiments. In some embodiments, a state machine 530 of an XMSS implementation for a reconfigurable circuit device, such as the state machine 525 illustrated in FIG. 5A, includes a controller component 532 to handle the dataflow for XMSS signature or verify operation. The controller 532 is to control one or more dedicated SHA-2 engines 534, as well as providing local registers 536 to store intermediate and pre-computed values for XMSS performance enhancement.

In some embodiments, depending on the resource requirements for a reconfigurable circuit device, the state machine 540 may be configured to either use LUTs within the fabric of the reconfigurable circuit device, such as FPGA fabric 520 illustrated in FIG. 5A, for storage elements or to map all sequential logic to embedded memory, such as embedded memory 505 in FIG. 5A. This can be performed during the initial configuration or re-configured dynamically on the field. This feature enables the flexibility to add new features on the reconfigurable circuit device, while still maintaining reliable XMSS performance. In some embodiments, the reconfiguration may be extended to enabling or disabling on-fabric SHA-2 engines 534 to trade-off performance versus resource utilization as required.

Figure 5C:
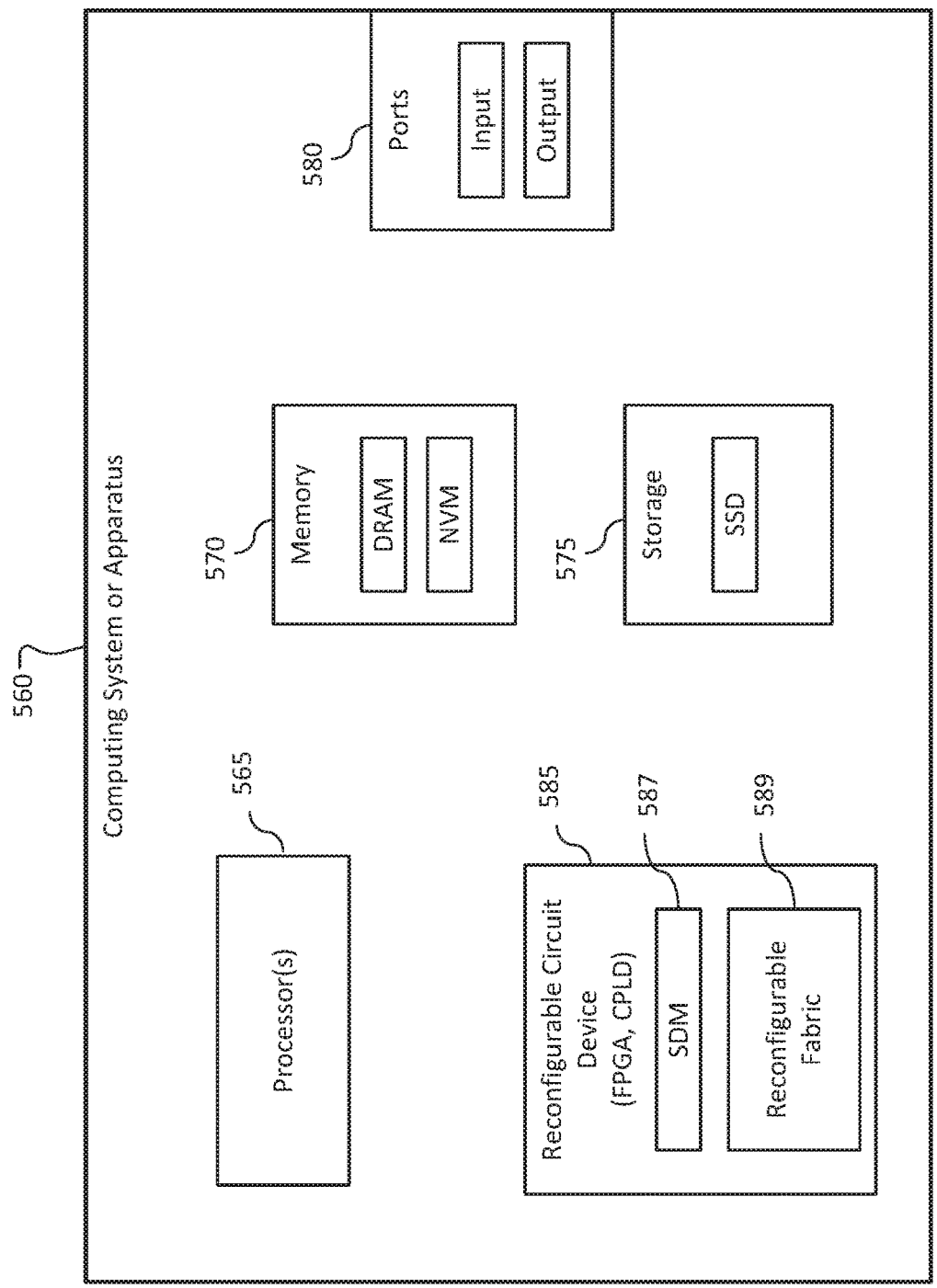
FIG. 5C illustrates a computing system or apparatus including a reconfigurable circuit device for XMSS signature operation according to some embodiments.

FIG. 5C illustrates a computing system or apparatus including a reconfigurable circuit device for XMSS signature operation according to some embodiments. In some embodiments, a computing system or apparatus 560 includes one or more processors 565; memory 570 to hold data, which may include volatile memory such as a dynamic random access memory (DRAM) and non-volatile memory (NVM) such as flash memory; storage 575 for data, such as a solid state drive (SSD), hard drive, or other storage device; and one or more input and output ports 580 for the receipt or transmission (including either or both of wired and wireless transmission) of data. The computing system or apparatus 460 may include additional components as provided in the computing architecture 700 illustrated in FIG. 7.

In some embodiments, the computing system or apparatus 560 further includes one or more reconfigurable circuit devices 585, which may include an FPGA, a CPLD, or other reconfigurable circuit device. In some embodiments, the reconfigurable circuit device 585 is to be programmed to provide XMSS signature operation utilizing a hardware element of the SDM 587 and a state machine implemented in the programmable interconnect fabric 589 of the reconfigurable circuit device, as illustrated for FPGA 500 in FIG. 5A.

Figure 6:
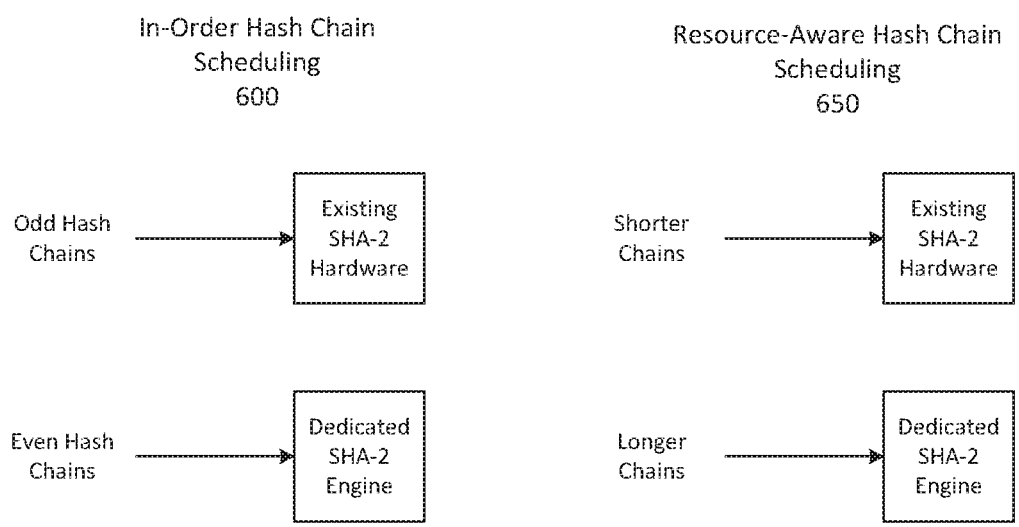
FIG. 6 illustrates resource aware hash scheduling for a reconfigurable circuit device for XMSS signature operation according to some embodiments.

FIG. 6 illustrates resource aware hash scheduling for a reconfigurable circuit device for XMSS signature operation according to some embodiments. In some embodiments, a reconfigurable circuit device, such as FPGA 500 illustrated in FIG. 5A, provides hash scheduling, utilizing existing hardware and dedicated security implementation that is programmed into the device, in a manner that recognizes the resource limitations of the device.

For a high throughput application, additional SHA-2 engines can be implemented on the FPGA fabric, such as in FPGA fabric 520 of FPGA illustrated in FIG. 5A, to work along with the existing SHA-2 accelerator 515. Depending on the interface with existing SHA-2 engine (such as SDM interface), there may be a latency overhead involved in transacting data between the SHA-2 engine and the XMSS state machine. However, dedicated SHA-2 engines implemented on the fabric do not incur such overheads. Because the WOTS chain lengths during sign/verify are variable depending on the input message, a resource aware scheduling is proposed to achieve near ideal resource utilization and XMSS performance.

A common approach to scheduling may assign the WOTS chains alternatingly between the existing SHA-2 engine and the dedicated fabric SHA-2 engines. This may, for example, be the in-order hash chain scheduling 600 illustrated in FIG. 6, wherein odd hash chains are scheduled to the existing SHA-2 engines (i.e. the hardware of the reconfigurable circuit device) and even hash chains are scheduled to the dedicated SHA-2 engines (i.e., the SHA-2 engines configured into the fabric of the reconfigurable circuit device), or the reverse for the odd and even hash chains. There are other similar examples that may be applied. However, this scheduling does not take into account the nature of resources available for hash chain processing.

In some embodiments, the XMSS state machine is to utilize resource aware hash chain scheduling 650, wherein the hash chain scheduling is based at least in part on the resources (including the SHA-2) of the FPGA. In particular implementation, the XMSS state machine is to schedule the hash chains based on the chain length, with shorter chains being assigned to the slower existing SHA-2 engine while longer chains are scheduled to performed by the dedicated SHA-2 engine in the FPGA fabric.

In an alternative implementation of resource aware hash chain scheduling 650, a low speed SHA-2 hardware may be designed and implemented on an FPGA fabric. In this instance, the existing SHA-2 in SDM may be faster than the dedicated SHA-2 hardware. For this reason, the hash chain scheduler may accordingly assign a longer hash chain to the existing SHA-2 engine and assign a shorter hash chain to the dedicated SHA-2 engine. Other instances of resource aware hash chain scheduling may also be implemented.

In some embodiments, the number of chains assigned to each engine is also dynamically configured depending on the message and resource availability. This scheduling minimizes the idle time of either engines, and improves speed for XMSS operation.

Embodiments providing resource aware scheduling, such as illustrated in FIG. 6, are scalable to more than one dedicated engine implemented on the fabric. In some embodiments, the controller component is configurable to dynamically change the number of available SHA-2 engines and adapt to the available resources for hash chain scheduling.

Figure 7:
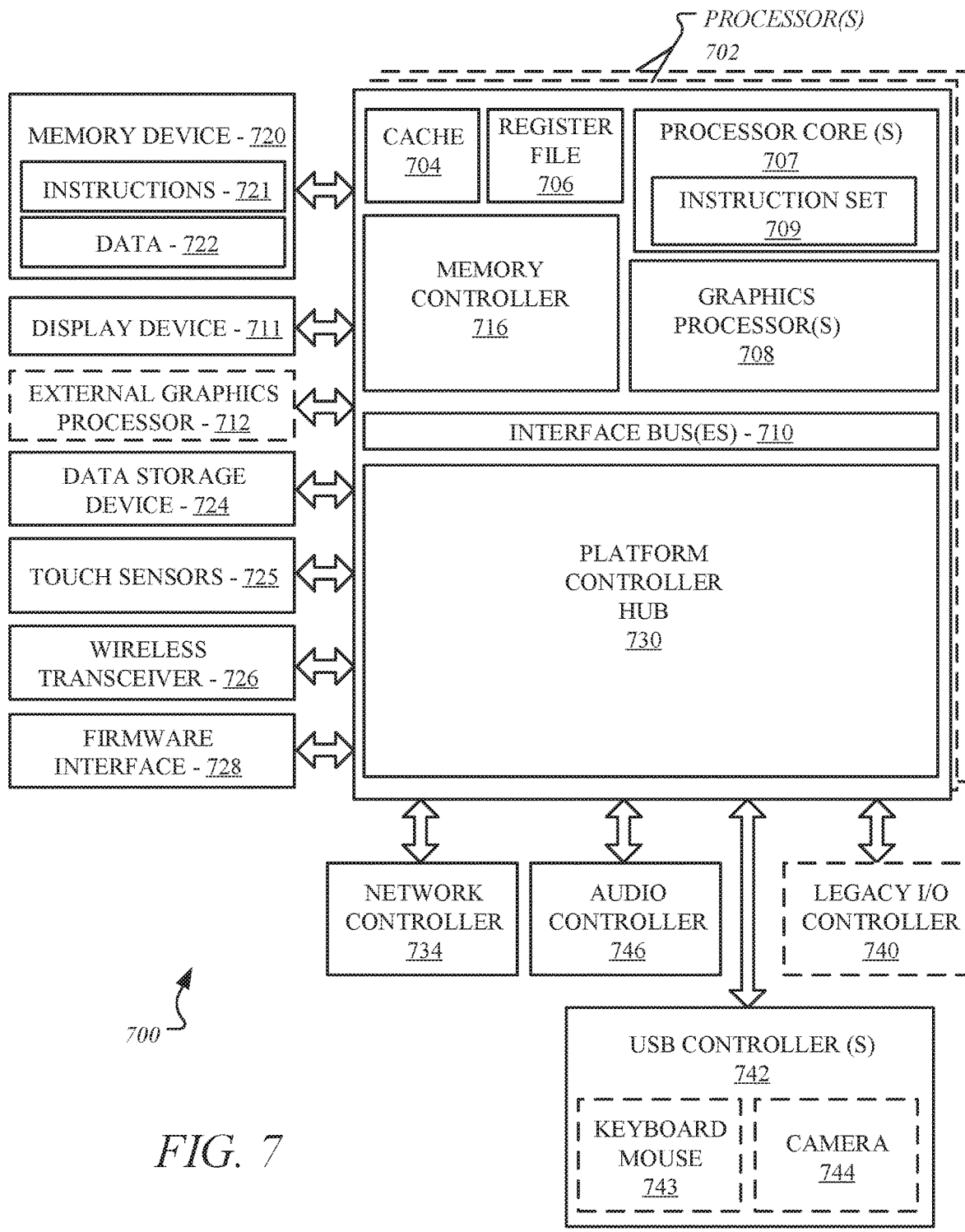
FIG. 7 illustrates a schematic illustration of a computing architecture which may be adapted to implement adversarial training of neural networks using information about activation path differentials in accordance with some examples.

FIG. 7 illustrates an embodiment of an exemplary computing architecture that may be suitable for implementing various embodiments as previously described. The embodiments may include a computing architecture including post quantum public key signature verification for reconfigurable circuit devices, such as illustrated in FIGS. 3A to 6.

In various embodiments, the computing architecture 700 may comprise or be implemented as part of an electronic device. In some embodiments, the computing architecture 700 may be representative, for example, of a computer system that implements one or more components of the operating environments described above. In some embodiments, computing architecture 700 may be representative of one or more portions or components of a Deep Neural Network (DNN) training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In some embodiments, an apparatus includes one or more processors; and a reconfigurable circuit device, the reconfigurable circuit device including a dedicated cryptographic hash hardware engine, and a reconfigurable fabric including a plurality of logic elements (LEs), wherein the one or more processors are to configure the reconfigurable circuit device for public key signature operation, including mapping a state machine for public key generation and verification to the reconfigurable fabric, including mapping one or more cryptographic hash engines to the reconfigurable fabric, and combining the dedicated cryptographic hash hardware engine with the one or more mapped cryptographic hash engines for cryptographic signature generation and verification.

In some embodiments, the reconfigurable circuit device is one of an FPGA (Field Programmable Gate Array) or CPLD (Complex Programmable Logic Device).

In some embodiments, the public key signature operation includes XMSS (Extended Merkel Signature Scheme).

In some embodiments, the dedicated cryptographic hash hardware engine and the one or more mapped cryptographic hash engines are SHA-2 (Secure Hash Algorithm 2) engines.

In some embodiments, the dedicated cryptographic hash hardware engine is a part of a secure device manager (SDM).

In some embodiments, the state machine includes a controller to control operation of the public key generation and verification.

In some embodiments, the controller is to schedule hash chains for the public key generation and verification between the dedicated cryptographic hash hardware engine and the one or more mapped cryptographic hash engines based at least in part on resources of the reconfigurable circuit device.

In some embodiments, the scheduling of hash chains includes one or more of scheduling hash chains based at least in part on a length of each hash chain or hash chains based at least in part on a length of each hash chain.

In some embodiments, configuring the reconfigurable circuit device for public key signature operation further includes configuring storage for public key signature operation either to embedded memory of the reconfigurable circuit device or to reconfigurable fabric.

In some embodiments, one or more non-transitory computer-readable storage mediums having stored thereon executable computer program instructions that, when executed by one or more processors, cause the one or more processors to perform operations including configuring a reconfigurable circuit device to public key signature operation, including mapping a state machine for public key generation and verification to a reconfigurable fabric of the reconfigurable circuit device, including mapping one or more cryptographic hash engines to the reconfigurable fabric, and combining dedicated cryptographic hash hardware engine of the reconfigurable circuit device with the one or more mapped cryptographic hash engines for cryptographic signature generation and verification; and performing a public signature generation or verification utilizing the reconfigurable circuit device.

In some embodiments, the reconfigurable circuit device is one of an FPGA (Field Programmable Gate Array) or CPLD (Complex Programmable Logic Device).

In some embodiments, the public key signature operation includes XMSS (Extended Merkel Signature Scheme).

In some embodiments, the dedicated cryptographic hash hardware engine and the one or more mapped cryptographic hash engines are SHA-2 (Secure Hash Algorithm 2) engines.

In some embodiments, the instructions further include instructions for scheduling hash chains for the public key generation and verification between the dedicated cryptographic hash hardware engine and the one or more mapped cryptographic hash engines based at least in part on resources of the reconfigurable circuit device.

In some embodiments, the scheduling of hash chains includes one or more of scheduling hash chains based at least in part on a length of each hash chain or hash chains based at least in part on a length of each hash chain.

In some embodiments, configuring the reconfigurable circuit device for public key signature operation further includes configuring storage for public key signature operation either to embedded memory of the reconfigurable circuit device or to reconfigurable fabric.

In some embodiments, a computing system includes one or more processors; dynamic random access memory (DRAM) for storage of data; and an FPGA (Field Programmable Gate Array), the FPGA including a dedicated cryptographic hash hardware engine, and a reconfigurable fabric including a plurality of logic elements (LEs), wherein the one or more processors are to configure the FPGA for XMSS (Extended Merkel Signature Scheme) public key signature operation, including mapping a state machine for XMSS public key generation and verification to the reconfigurable fabric, including mapping one or more cryptographic hash engines to the reconfigurable fabric, and combining the dedicated cryptographic hash hardware engine with the one or more mapped cryptographic hash engines for cryptographic signature generation and verification.

In some embodiments, the dedicated cryptographic hash hardware engine and the one or more mapped cryptographic hash engines are SHA-2 (Secure Hash Algorithm 2) engines.

In some embodiments, the dedicated cryptographic hash hardware engine is a part of a secure device manager (SDM).

In some embodiments, the state machine includes a controller component to control operation of the XMSS public key generation and verification.

In some embodiments, the controller component is to schedule hash chains for the XMSS public key generation and verification between the dedicated cryptographic hash hardware engine and the one or more mapped cryptographic hash engines based at least in part on resources of the FPGA.

In some embodiments, a method includes configuring a reconfigurable circuit device to public key signature operation, including mapping a state machine for public key generation and verification to a reconfigurable fabric of the reconfigurable circuit device, including mapping one or more cryptographic hash engines to the reconfigurable fabric, and combining dedicated cryptographic hash hardware engine of the reconfigurable circuit device with the one or more mapped cryptographic hash engines for cryptographic signature generation and verification; and performing a public signature generation or verification utilizing the reconfigurable circuit device.

In some embodiments, the reconfigurable circuit device is one of an FPGA (Field Programmable Gate Array) or CPLD (Complex Programmable Logic Device).

In some embodiments, the public key signature operation includes XMSS (Extended Merkel Signature Scheme).

In some embodiments, the dedicated cryptographic hash hardware engine and the one or more mapped cryptographic hash engines are SHA-2 (Secure Hash Algorithm 2) engines.

In some embodiments, the method further includes scheduling hash chains for the public key generation and verification between the dedicated cryptographic hash hardware engine and the one or more mapped cryptographic hash engines based at least in part on resources of the reconfigurable circuit device.

In some embodiments, the scheduling of hash chains includes one or more of scheduling hash chains based at least in part on a length of each hash chain or hash chains based at least in part on a length of each hash chain.

In some embodiments, configuring the reconfigurable circuit device for public key signature operation further includes configuring storage for public key signature operation either to embedded memory of the reconfigurable circuit device or to reconfigurable fabric.

In some embodiments, an apparatus includes means for configuring a reconfigurable circuit device to public key signature operation, including means for mapping a state machine for public key generation and verification to a reconfigurable fabric of the reconfigurable circuit device, including mapping one or more cryptographic hash engines to the reconfigurable fabric, and means for combining dedicated cryptographic hash hardware engine of the reconfigurable circuit device with the one or more mapped cryptographic hash engines for cryptographic signature generation and verification; and means for performing a public signature generation or verification utilizing the reconfigurable circuit device.

In some embodiments, the reconfigurable circuit device is one of an FPGA (Field Programmable Gate Array) or CPLD (Complex Programmable Logic Device).

In some embodiments, the public key signature operation includes XMSS (Extended Merkel Signature Scheme).

In some embodiments, the dedicated cryptographic hash hardware engine and the one or more mapped cryptographic hash engines are SHA-2 (Secure Hash Algorithm 2) engines.

In some embodiments, the apparatus further includes means for scheduling hash chains for the public key generation and verification between the dedicated cryptographic hash hardware engine and the one or more mapped cryptographic hash engines based at least in part on resources of the reconfigurable circuit device.

In some embodiments, the scheduling of hash chains includes one or more of scheduling hash chains based at least in part on a length of each hash chain or hash chains based at least in part on a length of each hash chain.

In some embodiments, configuring the reconfigurable circuit device for public key signature operation further includes configuring storage for public key signature operation either to embedded memory of the reconfigurable circuit device or to reconfigurable fabric.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
one or more processors; and
a reconfigurable circuit device, the reconfigurable circuit device including:
a dedicated cryptographic hash hardware engine, and
a reconfigurable fabric including a plurality of logic elements (LEs);
wherein the one or more processors are to configure the reconfigurable circuit device for public key signature operation, including:
mapping a state machine for public key generation and verification to the reconfigurable fabric, including mapping one or more cryptographic hash engines to the reconfigurable fabric, the state machine including a controller to control operation of the public key generation and verification,
combining the dedicated cryptographic hash hardware engine with the one or more mapped cryptographic hash engines for cryptographic signature generation and verification, and
scheduling hash chains for the public key generation and verification between the dedicated cryptographic hash hardware engine and the one or more mapped cryptographic hash engines based at least in part on resources of the reconfigurable circuit device, including scheduling hash chains based at least in part on a length of each hash chain.

2. The apparatus of claim 1, wherein the reconfigurable circuit device is one of an FPGA (Field Programmable Gate Array) or CPLD (Complex Programmable Logic Device).

3. The apparatus of claim 1, wherein the public key signature operation includes XMSS (Extended Merkel Signature Scheme).

4. The apparatus of claim 1, wherein the dedicated cryptographic hash hardware engine and the one or more mapped cryptographic hash engines are SHA-2 (Secure Hash Algorithm 2) engines.

5. The apparatus of claim 1, wherein the dedicated cryptographic hash hardware engine is a part of a secure device manager (SDM).

6. The apparatus of claim 1, wherein configuring the reconfigurable circuit device for public key signature operation further includes configuring storage for public key signature operation either to embedded memory of the reconfigurable circuit device or to the reconfigurable fabric.

7. One or more non-transitory computer-readable storage mediums having stored thereon executable computer program instructions that, when executed by one or more processors, cause the one or more processors to perform operations comprising:
configuring a reconfigurable circuit device to public key signature operation, including:
mapping a state machine for public key generation and verification to a reconfigurable fabric of the reconfigurable circuit device, including mapping one or more cryptographic hash engines to the reconfigurable fabric,
combining dedicated cryptographic hash hardware engine of the reconfigurable circuit device with the one or more mapped cryptographic hash engines for cryptographic signature generation and verification, and
scheduling hash chains for the public key generation and verification between the dedicated cryptographic hash hardware engine and the one or more mapped cryptographic hash engines based at least in part on resources of the reconfigurable circuit device, including scheduling hash chains based at least in part on a length of each hash chain; and
performing a public signature generation or verification utilizing the reconfigurable circuit device.

8. The one or more mediums of claim 7, wherein the reconfigurable circuit device is one of an FPGA (Field Programmable Gate Array) or CPLD (Complex Programmable Logic Device).

9. The one or more mediums of claim 7, wherein the public key signature operation includes XMSS (Extended Merkel Signature Scheme).

10. The one or more mediums of claim 7, wherein the dedicated cryptographic hash hardware engine and the one or more mapped cryptographic hash engines are SHA-2 (Secure Hash Algorithm 2) engines.

11. The one or more mediums of claim 7, wherein configuring the reconfigurable circuit device for public key signature operation further includes configuring storage for public key signature operation either to embedded memory of the reconfigurable circuit device or to the reconfigurable fabric.

12. A computing system comprising:
one or more processors;
dynamic random access memory (DRAM) for storage of data; and
an FPGA (Field Programmable Gate Array), the FPGA including:
a dedicated cryptographic hash hardware engine, and
a reconfigurable fabric including a plurality of logic elements (LEs);
wherein the one or more processors are to configure the FPGA for XMSS (Extended Merkel Signature Scheme) public key signature operation, including:
mapping a state machine for XMSS public key generation and verification to the reconfigurable fabric, including mapping one or more cryptographic hash engines to the reconfigurable fabric, wherein the state machine includes a controller component to control operation of the XMSS public key generation and verification,
combining the dedicated cryptographic hash hardware engine with the one or more mapped cryptographic hash engines for cryptographic signature generation and verification, and
scheduling hash chains for the public key generation and verification between the dedicated cryptographic hash hardware engine and the one or more mapped cryptographic hash engines based at least in part on resources of the FPGA, including scheduling hash chains based at least in part on a length of each hash chain.

13. The computing system of claim 12, wherein the dedicated cryptographic hash hardware engine and the one or more mapped cryptographic hash engines are SHA-2 (Secure Hash Algorithm 2) engines.

14. The computing system of claim 12, wherein the dedicated cryptographic hash hardware engine is a part of a secure device manager (SDM).

15. The computing system of claim 12, wherein configuring the FPGA for XMSS public key signature operation further includes configuring storage for XMSS public key signature operation either to embedded memory of the FPGA or to the reconfigurable fabric.

* * * * *